(12) United States Patent
Sorond et al.

(10) Patent No.: US 11,212,696 B2
(45) Date of Patent: Dec. 28, 2021

(54) MULTI-TENANT WIRELESS NETWORK MANAGEMENT BASED ON TRAFFIC MONITORING

(71) Applicant: DISH Wireless L.L.C., Englewood, CO (US)

(72) Inventors: Mariam Sorond, Reston, VA (US); Amirali Emami, Vienna, VA (US); Siddhartha Chenumolu, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 138 days.

(21) Appl. No.: 16/518,859

(22) Filed: Jul. 22, 2019

(65) Prior Publication Data
US 2021/0029576 A1    Jan. 28, 2021

(51) Int. Cl.
| | |
|---|---|
| *H04W 28/02* | (2009.01) |
| *H04L 12/46* | (2006.01) |
| *H04W 28/20* | (2009.01) |
| *H04L 12/24* | (2006.01) |
| *H04W 24/08* | (2009.01) |
| *G06N 20/00* | (2019.01) |
| *H04L 29/08* | (2006.01) |

(52) U.S. Cl.
CPC ........ *H04W 28/0268* (2013.01); *G06N 20/00* (2019.01); *H04L 12/4641* (2013.01); *H04L 41/12* (2013.01); *H04W 24/08* (2013.01); *H04W 28/20* (2013.01); *H04L 67/12* (2013.01)

(58) Field of Classification Search
CPC . H04W 28/0268; H04W 28/20; H04W 24/08; H04L 41/12; H04L 67/12

USPC ......................................................... 370/230
See application file for complete search history.

(56) References Cited

U.S. PATENT DOCUMENTS

2018/0101398 A1    4/2018    Barabash et al.

OTHER PUBLICATIONS

Zhang Xi et al: "Information-centric network virtualization for QoS provisioning over software defined wireless networks", MILCOM 2016-2016 IEEE Military Communications Conference, IEEE, Nov. 1, 2016, pp. 1028-1033, XP033028224, DOI: 10.1109/MILCOM.2016.7795465 [retrieved on Dec. 22, 2016] I. Introduction; II. System Model; III. Virtual Wireless Networks Architecture to Maximize Effective Capacity; VII. Conclusions.
(Continued)

*Primary Examiner* — Angel T Brockman
(74) *Attorney, Agent, or Firm* — Kilpatrick Townsend & Stockton LLP (57) ABSTRACT

Arrangements involving a multi-tenant network management system are presented. A first virtual wireless network can be operated as part of a wireless network. The first virtual wireless network can be mapped to a first set of operating level-of-service parameters. A second virtual wireless network can also be operated as part of the wireless network on behalf of a third entity. The second virtual wireless network can be mapped to a second set of level-of-service operating parameters. A traffic monitoring system may be present that monitors and compiles traffic-related statistics for the first virtual wireless network and the second virtual wireless network separately. A virtual network management system can use a machine learning arrangement to determine how to modify properties of the first virtual wireless network to satisfy the first set of level-of-service operating parameters.

18 Claims, 4 Drawing Sheets

(56) References Cited

OTHER PUBLICATIONS

Qi Sun China Mobile et al: "New ITU-T draft Supplement Y.ML-IMT2020-Use-Cases "Machine learning in future networks including IMT-2020; use cases", output of Q20/13 meeting, Geneva, Jun. 17-28, 2019; TD397/WP1", ITU-T Draft; Study Period 2017-2020; Study Group 13; Series TD397/WP1, International Telecommunication Union, Geneva; CH, vol. 20/13 Jun. 27, 2019, pp. 1-53, XP044269082, Retrieved from the Internet: URL: https://www.itu.int/ifa/t/2017/sg13/exchange/wp1/q20/2019-06/output-drafts/ML-Use%20Cases%20and%20Reqts/T397-Y.ML-IMT2020-Use-Cases-v2-1.docx [retrieved on Jun. 27, 2019] 9.1. Use case description; 6.26. Energy Efficient Trusted Multi-tenancy in 5G-Crosshaul Use case description.

International Search Report and Written Opinion for PCT/US2020/041898 dated Oct. 20, 2020, all pages.

MULTI-TENANT WIRELESS NETWORK MANAGEMENT BASED ON TRAFFIC MONITORING

BACKGROUND

A network operator may frequently have to reconfigure its network in order to satisfy various quality-of-service metrics. Understanding how to properly reconfigure the network may be a complex task performed by highly-skilled network architects. Reconfiguration of a network may get significantly more complex when there are completing interests, such as multiple virtual networks being operated on a single physical network. Arrangements detailed herein help optimize reconfiguration of a network.

SUMMARY

Various embodiments are described related to a multi-tenant network management system. In some embodiments, a multi-tenant network management system is described. The system may include a wireless network operated by a first entity. The system may include a first virtual wireless network operated as part of the wireless network on behalf of a second entity. The first virtual wireless network may be mapped to a first set of operating level-of-service parameters. The system may include a second virtual wireless network operated as part of the wireless network on behalf of a third entity. The second virtual wireless network may be mapped to a second set of level-of-service operating parameters that may differ from the first set of level-of-service operating parameters. The system may include a traffic monitoring system that may monitor and compile traffic-related statistics for the first virtual wireless network and the second virtual wireless network separately. The system may include a virtual network management system in communication with the traffic monitoring system. The virtual network management system may use a machine learning arrangement to determine how to modify properties of the first virtual wireless network to satisfy the first set of level-of-service operating parameters. The virtual network management system may modify the first virtual wireless network based on the machine learning arrangement.

Embodiments of such a system may include one or more of the following features: the virtual network management system modifying the first virtual wireless network may include altering an amount of wireless bandwidth assigned to the first virtual wireless network. The virtual network management system modifying the first virtual wireless network may include altering a network topology of the first virtual wireless network to decrease latency. The virtual network management system modifying the first virtual wireless network may include assigning additional processing resources to the first virtual wireless network. The virtual network management system modifying the first virtual wireless network may include moving processing capabilities closer to an edge of the first virtual wireless network. Moving processing capabilities closer to the edge of the first virtual wireless network may include switching a data center hosting the processing capabilities. The machine learning arrangement may be a neural network that provides an output. The traffic monitoring system may compile separate short-term statistics and long-term traffic statistics for the first virtual wireless network and the second virtual wireless network. Short-term statistics may cover a time period of less than one week and long-term statistics may cover a time period of more than one week. The virtual network management system may be further configured to output a long-term recommendation. The virtual network management system may be further configured to determine how to modify properties of the second virtual wireless network to satisfy the second set of level-of-service operating parameters. The first wireless network and the second virtual wireless network may be each exclusively used for communication with Internet of Things (IoT) devices.

In some embodiments, a method for managing a multi-tenant wireless network is described. The method may include monitoring, by a wireless network, traffic associated with a first virtual wireless network operating on the wireless network. The wireless network may be operated by a first entity. The first virtual wireless network may be operated on behalf of a second entity. The first virtual wireless network may be mapped to a first set of operating level-of-service parameters. The method may include monitoring, by the wireless network, traffic associated with a second virtual wireless network operating on the wireless network. The second virtual wireless network may be operated on behalf of a third entity. The second virtual wireless network may be mapped to a second set of level-of-service operating parameters that differ from the first set of level-of-service operating parameters. The method may include compiling, by a virtual network management system, traffic-related statistics for the first virtual wireless network and the second virtual wireless network separately. The method may include determining, by the virtual network management system, how to modify properties of the first virtual wireless network to satisfy the first set of level-of-service operating parameters. The method may include modifying, by the virtual network management system, the first virtual wireless network based on the analyzing.

Embodiments of such a method may include one or more of the following features: the virtual network management system modifying the first virtual wireless network may include altering an amount of wireless bandwidth assigned to the first virtual wireless network. The virtual network management system modifying the first virtual wireless network may include altering a network topology of the first virtual wireless network to decrease latency. The virtual network management system modifying the first virtual wireless network may include assigning additional processing resources to the first virtual wireless network. The virtual network management system modifying the first virtual wireless network may include moving processing capabilities closer to an edge of the first virtual wireless network. Moving processing capabilities closer to the edge of the first virtual wireless network may include switching a data center hosting the processing capabilities. The determining may be performing using a neural network. The determining may include compiling separate short-term statistics and long-term traffic statistics for the first virtual wireless network and the second virtual wireless network. Short-term statistics may cover a time period of less than one week and long-term statistics may cover a time period of more than one week. The method may further include determining, by the virtual network management system, how to modify properties of the second virtual wireless network to satisfy the second set of level-of-service operating parameters.

DETAILED DESCRIPTION

A wireless network operator may provide virtual wireless networks for multiple unaffiliated virtual network operators (VNOs) using a single physical wireless network. Each VNO may have a specific set of quality-of-service (QoS) parameters that the wireless network operator has committed to providing for the VNO. The QoS for each VNO may differ in one or more respects. For instance, a first VNO may have associated with it QoS parameters that define a small amount of data throughput being delivered with low-latency. A second VNO may have associated with it QoS parameters that define a large amount of data being delivered with a higher latency. A third VNO may have associated QoS parameters high data throughput and very low latency.

A virtual network management system (VNMS) may function in communication with or as part of the physical wireless network. Traffic specific to each VNO's virtual wireless network (VWN) may be monitored for various characteristics (e.g., data volume, latency, etc.) A VNMS may periodically or occasionally analyze the collected traffic data for each VWN individually. The VNMS may analyze the traffic data in combination with the QoS parameters associated with the particular VWN. When the VNMS detects a situation in which the VWN is performing below its mapped QoS parameters, the VNMS may modify one or more characteristics of how the VWN is operating in an attempt to meet the mapped QoS parameters. Conversely, when a situation is detected in which the VWN is performing significantly above its mapped QoS parameters, the VNMS may modify one or more characteristics of how the VWN is operating in an attempt to still meet the mapped QoS parameters without devoting unnecessary network resources.

The VNMS can perform modifications to how each VWN functions. The VNMS may use a form of artificial intelligence (AI), such as a trained neural network, machine learning (ML) and/or big-data analytics (which involves attempting to make optimal decisions based on a large set of measurements or historical data) to determine how the functionality of the wireless network should be modified in order to satisfy the QoS parameters mapped to the VWN. Certain modifications to the functionality of the wireless network may be made by the VNMS without any input being required from an administrator. Other changes, such as those including the addition or removal of hardware, may be output by the VNMS in the form of recommendations to be implemented by an administrator.

Such embodiments, as detailed herein, may be particularly useful for Internet-of-Things (IoT) focused VWNs. Many entities would prefer to function as a VNO so that the VNO entity does not have to construct its own physical network. Rather, the VNO can agree to QoS parameters with an entity that already has a physical wireless network in-place. Further, entities in the IoT space, based upon the particular business field they are in, may have vastly different needs for QoS. For instance, a first entity that has many parking facilities scattered across a geographical region may desire to collect data from and distribute data to its on-site parking systems. This data, since it is for parking, may be relatively light in volume and latency (e.g., of several seconds) may be fairly inconsequential. However, a second entity that processes credit card transactions may desire significantly less latency than the first entity. While the below embodiments focus on VWNs that communicate predominantly or exclusively with IoT devices, it should be understood that other embodiments can predominantly or exclusively communicate with other forms of wireless devices, such as smartphone, cellular phones, etc. Wired network arrangements are also possible.

Figure 1:
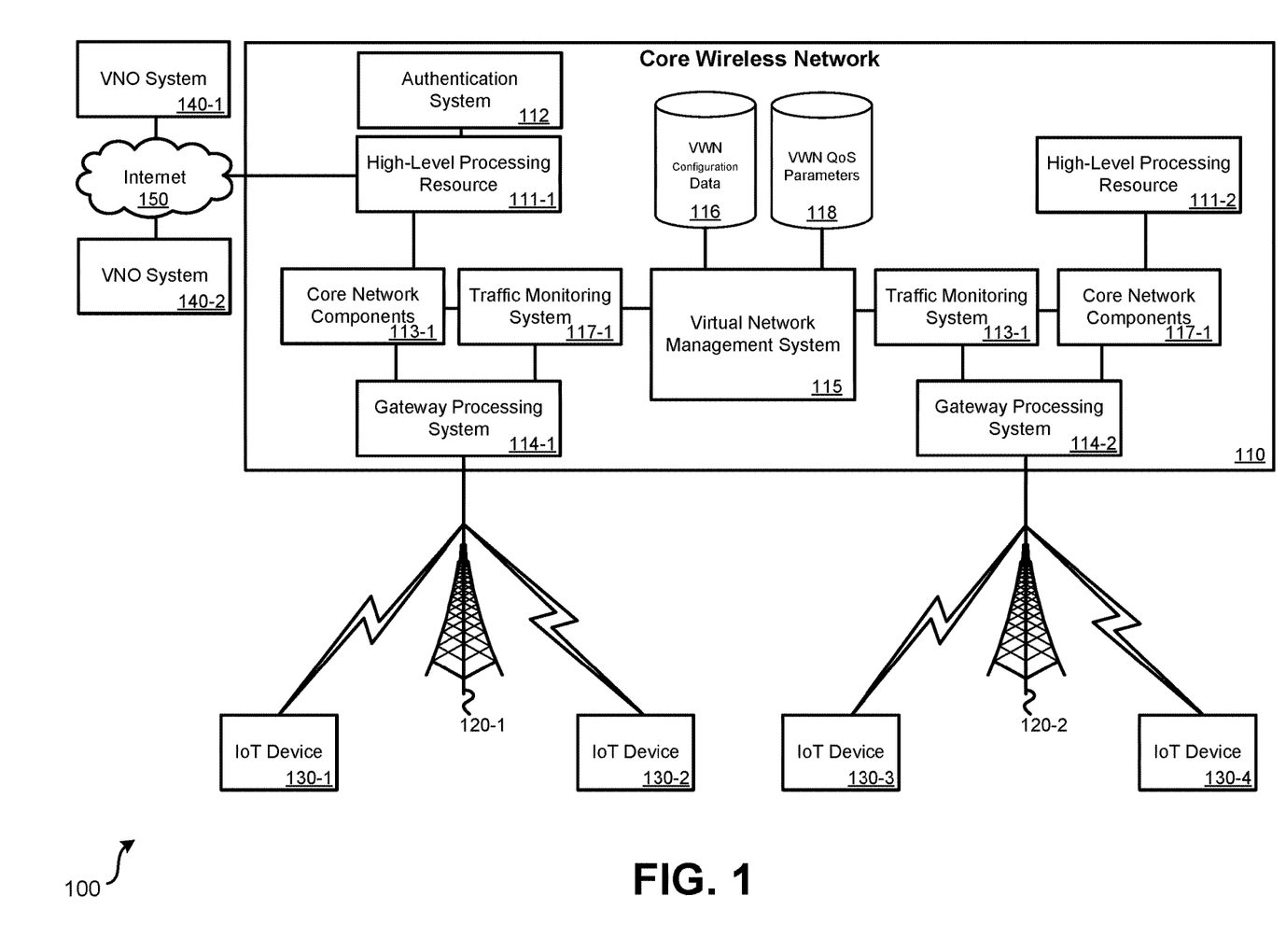
FIG. 1 illustrates an embodiment of a multi-tenant network management system.

Details regarding the above embodiments and other embodiments are provided in relation to the figures. FIG. 1 illustrates an embodiment of a multi-tenant network management system 100. Multi-tenant network management system 100 can include: core wireless network 110; base stations 120 (e.g., 120-1, 120-2); IoT devices 130 (e.g., 130-1, 130-2, 130-3, and 130-4); VNO systems 140 (e.g., 140-1, 140-2); and the Internet 150.

A wireless network may be operated by an entity, which can be referred to as the physical wireless network operator (PWNO). The PWNO may operate base stations 120 across a geographic region (e.g., a continent, a country, a state, a county, etc.). Depending on the type of wireless network, each cell associated with each base station of base stations 120 may vary greatly in size. For instance, a single base station (e.g., base station 120-1) may be able to service a relatively large geographic region, such as having a radius of 20-50 miles. Such a base station may be part of a NB-IoT (narrowband internet-of-things) network that uses a low-power wide area network (LPWAN) radio access technology (RAT). Alternatively, a base station may use a relatively higher power RAT such as 4G LTE (Long Term Evolution) or 5G NR (New Radio). The functional communication radius of a 5G NR base station may be less than half a mile. For a 4G LTE network, a base station can be an eNodeB (eNB); for a 5G NR network, a base station can be a gNodeB (gNB).

Various IoT devices 130 can communicate with base stations 120. By way of example, IoT devices 130-1 and 130-3 may be associated with a first VNO; IoT devices 130-2 and 130-4 may be associated with a second VNO. Therefore, IoT devices mapped to different VNOs can communicate with the same base stations 120. Each of base stations 120 may have a portion of bandwidth (e.g., a bandwidth part (BWP)) dedicated to a particular VNO. Mapping VNOs to different BWPs can isolate the VNOs on the air interface, but this arrangement may cause some statistical multiplexing loss. For semi-static cases, the system can measure the traffic of different VNOs and adjust the BW of BWPs accordingly. These BWPs may use different portions of the overall carrier bandwidth and may use different subcarrier spacings (SCSs). Alternatively, these BWPs may overlap and use the same SCS. Alternatively, IoT devices associated with different VNOs may use the same BWP for communication since communications can be scheduled by the base station. In such embodiments, isolation can be achieved without losing the statistical multiplexing gain by using an intelligent base station (e.g., gNB) scheduler that adjusts the BW of each VNO, dynamically.

Various processing tasks may be performed directly at base stations 120. For instance, gateway processing systems 114 may be incorporated as part of base stations 120. Gateway processing systems 114 may include one or more processors and non-transitory processor-readable mediums. Gateway processing systems 114 may be configured to execute instructions that are specific to particular VNOs. Therefore, data received from IoT device 130-1 that is associated with a particular VNO may be processed by gateway processing system 114-1 using instructions associated with the particular VNO. In other embodiments, gateway processing systems 114 may be remote from base stations 120 and may be part of core wireless network 110.

Core wireless network 110 can include: high-level processing resources 111 (e.g., 111-1, 111-2); authentication system 112; core network components 113 (e.g., 113-1, 113-2); gateway processing systems 114 (e.g., 114-1, 114-2); virtual network management system 115; VWN configuration data 116; VNO QoS parameters data structure 118, and traffic monitor systems 117 (e.g., 117-1, 117-2). As previously noted, gateway processing systems 114 may perform processing on data received from or to be sent to IoT devices 130. In some embodiments, gateway processing systems 114 are part of core wireless network 110 and are remote from base stations 120. In some embodiments, it should be understood that some core network components 113 may be positioned between gateway processing systems 114 and base station 120.

Core network components can represent at least some of the core components of a 4G LTE, NB-IoT LPWAN, or some other form of wireless network. For a 4G LTE network, the core components can include: PGW (packet data network gateway); SGW (servicing gateway); For a 5G NR network, core network components 113 can include UPF (user plane function).

Traffic monitoring systems 117 may monitor traffic at each component of the physical wireless network, including individual core network component 113 and base stations 120. Traffic monitoring systems 117 monitor and compile traffic data (e.g., volume of uplink and downlink data, latency of uplink and downlink data transfers, processing delays, etc.) throughout core wireless network 110 and base stations 120. Traffic monitoring systems 117 may maintain separate statistics for traffic associated with each VNO. Therefore, statistics particular to each VNO are compiled and stored.

Traffic monitoring systems 117 can maintain multiple types of traffic statistics. In some embodiments, traffic statistics for each VNO are broken into two overarching categories: short-term statistics and long-term statistics. Generally, short term statistics are specific to a relatively short period of time, such as between one hour and one week; long-term statistics are specific to a relatively long period of time, such as greater than one week (e.g., a month, a year). Again, the short-term and long-term statistics can be specific to each VNO.

In some embodiments, high-level processing resources 111 may be present. These processing resources may be geographically and hierarchically further from base stations 120 than gateway processing systems 114. A single high-level processing system, such as high-level processing resource 111-1, may service multiple base stations and gateway processing systems. High-level processing resources 111 may have greater computing resources and may perform more intense processing and data storage for VNOs. High-level processing resources 111 may be hosted by data centers that are geographically distributed. In some embodiments, high-level processing resources 111 may not be strictly part of core wireless network 110, but rather may be in communication with core wireless network 110. High-level processing resources 111 may be in communication with external VNO systems 140.

VNO systems 140 can each be operated by different virtual network operators. From the point-of-view of each VNO, the physical wireless network will appear dedicated to the VNO's data; that is, other VNO's use of the physical wireless network will be invisible to the VNO. A first VNO may operate one or more server systems as VNO system 140-1; a second VNO may operate one or more server systems as VNO system 140-2. VNO systems 140 may be completely unrelated and not in communication with each other since each is operated by a different, unaffiliated entity. Each VNO system of VNO systems 140 may communicate with core wireless network 110 for multiple purposes. First VNO systems 140 may transmit to and receive from core wireless network 110 data being exchanged with IoT devices of IoT devices 130 affiliated with the particular VNO system. For example, only IoT devices mapped to the VNO of VNO system 140-1 may be permitted to exchange data with VNO system 140-1. VNO systems 140 may also exchange authentication information with core wireless network 110. In order for an IoT device to be authorized to communicate using core wireless network 110, the IoT device may be required to be mapped to a particular VNO and be properly authenticated. A VNO provider, via a VNO system, may provide authentication information for each of its mapped IoT devices. For instance, VNO system 140-1 may provide authentication information (e.g., MAC addresses, IMSIs) for a variety of IoT Device, such as IoT device 130-1. Authentication information may be stored and managed by authentication system 112, which can include one or more server or processing systems and one or more non-transitory processor readable mediums. Authentication system 112 may receive a communication request from IoT device 130-1. Authentication system 112 may authenticate IoT device 130-1 based on the authentication data received from VNO system 140-1 and may permit IoT device 130-1 to communicate using the wireless network. IoT Device 130-1 may be mapped to the VNO provider operating VNO system 140-1.

Virtual network management system (VNMS) 115 may be in communication with traffic monitoring systems 117. VNMS 115 may periodically or occasionally receive compiled statistics (e.g., long-term and/or short-term statistics) from traffic monitoring systems 117 for each VNO. VNMS 115 may further access a data structure that stores VWN configuration data 116 detailing the computing resources, bandwidth, system architecture, etc. being used to operate the VWN for each VNO. VNMS 115 may also have access to VNO QoS parameters 118, which can be stored using a non-transitory processor readable-medium. VNO QoS parameters 118 defines for each VNO particular QoS parameters that are required to be met. Such VNO QoS parameters 118 can include: maximum latencies for uplink and downlink communications; and rates of data throughput for uplink and downlink communications. These QoS parameters may be based upon a contractual agreement between each VNO and the PWNO. Different VNOs may have at least some different QoS parameters. Further detail regarding VNMS 115 is provided in relation to FIG. 2.

Regarding the components of core wireless network 110, it should be understood that various distributed computing systems, communication buses, non-transitory processor-readable mediums, wired networks, and other computerized components are used for each component of core wireless network 110. Further, two instances of base stations 120, gateway processing systems 114; core network components 113; traffic monitoring systems 117; and high-level processing resources 111 are presented. It should be understood that this number of instances is merely an example. For example, many more base stations 120 may be present in a real-world embodiment. Similarly, it can be expected that many more than four IoT devices 130 would be in communication with base stations 120 in a real-world implementation.

Figure 2:
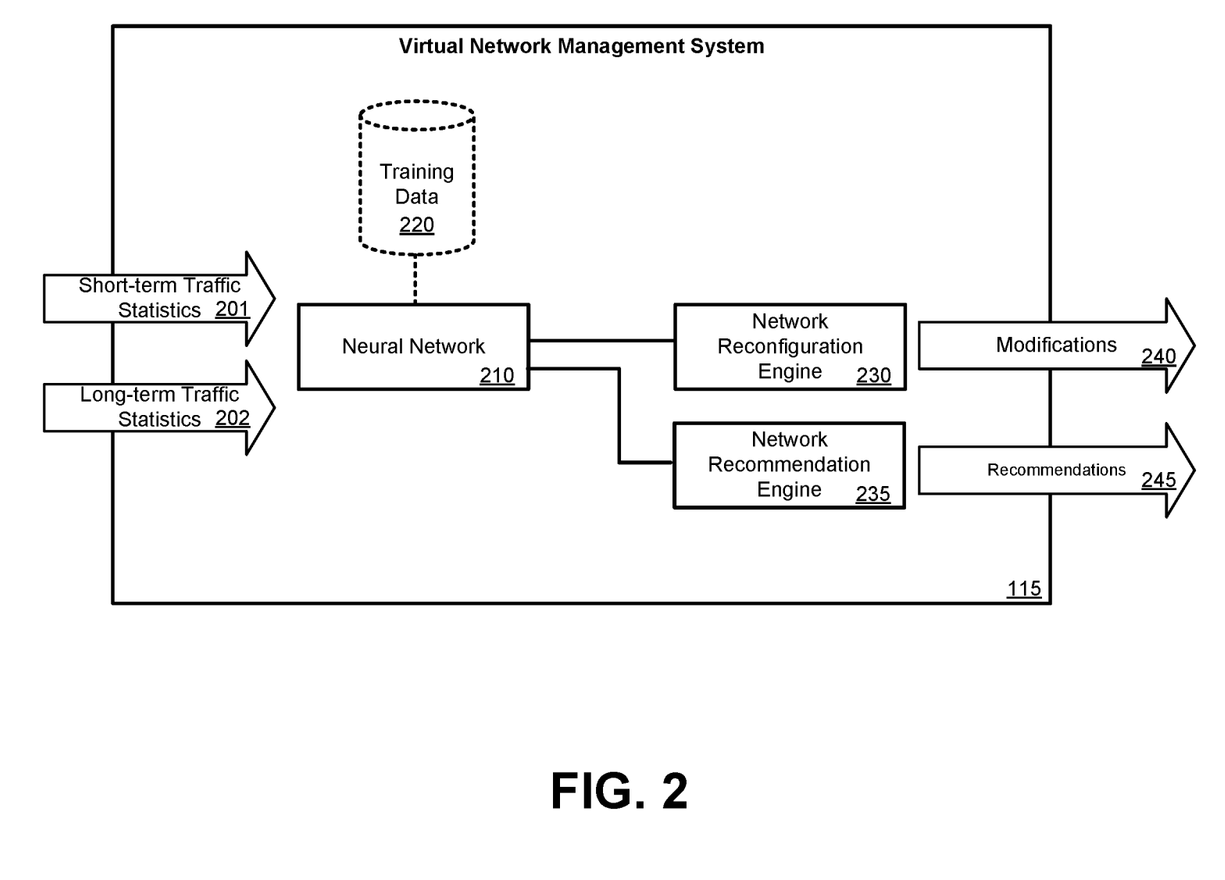
FIG. 2 illustrates an embodiment of a virtual network management system.

FIG. 2 illustrates an embodiment of a virtual network management system (VNMS) 115. VNMS may be implemented using one or more computer server systems that include one or more processors. Therefore, VNMS 115 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

VNMS 115 may include various components including: neural network 210 (that has been trained using training data 220); network reconfiguration engine 230; and network recommendation engine 235. Neural network 210 may be initially trained using a set of training data 220. Training data 220 can include data including network configurations and statistics, each instance of a network configuration and associated statistics may be mapped to a desired reconfiguration to how the network configuration should be modified based on the statistics. For instance, thousands of examples with correct network modifications may be used to form training data 220. A neural network can be trained using training data 220. The trained neural network 210 may be implemented using a processing system as part of VNMS 115.

While VNMS 115 is represented as using a neural network, it should be understood that other forms of AI or ML may be used. For instance, other types of trained networks may be used in place of a neural network. In some embodiments, big data analytics may be used instead. In such embodiments, large amounts of data may be captured about the functionality of the virtual wireless networks and analyzed for correlations, trends, etc. Such analytics may be used by network reconfiguration engine 230 and by network recommendation engine 235. In some embodiments, an algorithm, such as a Kalman filter may be implemented.

Neural network 210, after it has been trained, may receive statistics from traffic monitor systems 117. The statistics received by neural network 210 may be specific to each VNO's VWN. That is, for each VNO, a separate set of statistics is received by neural network 210. Accordingly, the outputs of neural network 210 will be specific to a particular VWN and VNO. In some embodiments, neural network 210 receives statistics that are divided into two sets: short-term statistics 201 and long-term statistics 202. In some embodiments, separate neural networks take the short-term and long-term traffic statistics as inputs and provide separate outputs (e.g., short-term and long-term modifications and recommendations). As part of the analysis by neural network 210, VWN configuration data 116 and VNO QoS parameters 118 may be accessed to determine the current VWN configuration for a VNO and the QoS parameters for the particular VNO, respectively. A comparison to VNO QoS parameters 118 may be performed to determine what QoS parameters are not being met (or are being exceeded by too great of a threshold margin) by the performance of the physical wireless network.

In some embodiments, an additional component may be present that functions as a predictor. A predictor can be configured to predict near future traffic for each VNO, such as based on short term statistics. Such predictions can be used to help to make optimal decisions and reconfigure the network ahead of increases or decreases in traffic on a VNO.

Based on the received traffic statistics, VWN configuration data 116, and VNO QoS parameters 118, neural network 210 may provide one or more outputs that include: 1) modifications to be implemented for a particular VNO's VWN; and/or 2) recommendation on how to modify a particular VNO's VWN. Network reconfiguration engine 230 may reconfigure the physical wireless network in accordance with the output of neural network 210 to have the performance of the physical wireless network more closely match (e.g., meet or slightly exceed) the VNO QoS parameters mapped to the corresponding VNO. Details of specific changes that may be performed by network reconfiguration engine 230 are provided in relation to FIG. 3. Information detailing modifications 240 may be output to appropriate portions of the physical wireless network for implementation.

Network recommendation engine 235 may output recommendations of how the physical wireless network can be reconfigured by an administrator. Such recommendations may not be appropriate or possible for the VNMS to implement without an administrator's intervention. For instance, a recommendation may be to add new computing resources in a particular location within the physical wireless network. As an example of this, a particular gateway processing system, such as gateway processing system 114-2 may not be able to satisfy a latency QoS parameter for a particular VNO. The gateway processing system 114-2 may not have any additional processing resources available for assigning to the VNO. Therefore, additional physical processing resources may need to be installed as part of gateway processing system 114-2 to help satisfy the VNO's QoS parameters. In other situations, particular changes to how the VWN functions may be considered to be so major that they require an administrator's approval or expertise to implement. The recommendations output by network recommendation engine 235 may be output as recommendations 245, such as for presentation to an administrator via a display device as a generated report.

Figure 3:
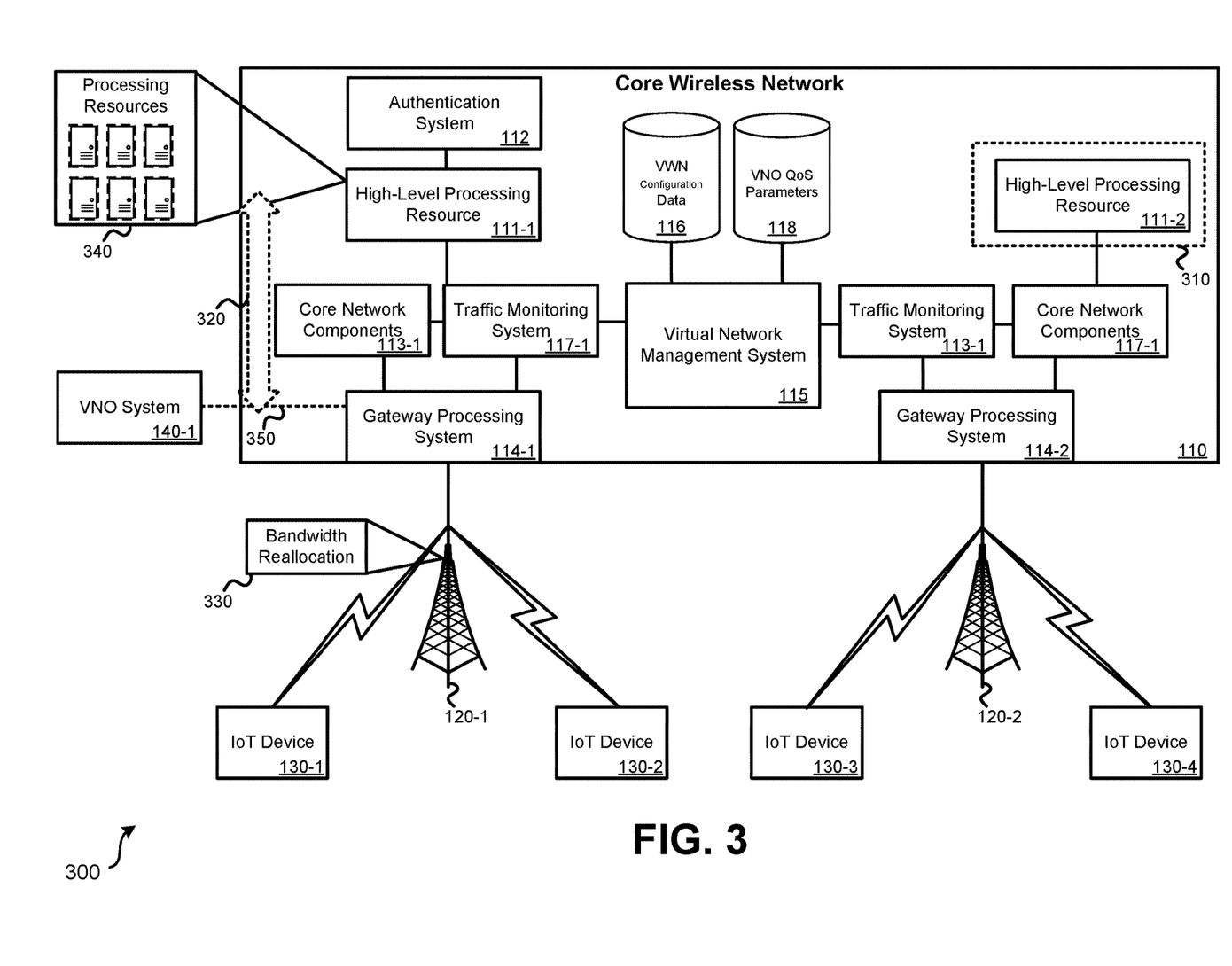
FIG. 3 illustrates an embodiment of changes that can be implemented by the multi-tenant network management system in order to satisfy operating level-of-service parameters.

At detailed in relation to FIG. 2, various modifications 240 can be directly implemented by VNMS 115 within the physical wireless network to confirm performance of a VNO's VWN to the QoS parameters mapped to the VNO. FIG. 3 illustrates an embodiment 300 of changes that can be implemented by the multi-tenant network management system in order to satisfy operating level-of-service parameters.

A first type of modification that can be implemented by the VNMS 115 without administrator approval or input may be to relocate processing resources. For instance, for a particular VNO, high-level processing may be performed a particular data center. VNMS 115 may determine that the distance between this data center and the IoT devices it services are creating too great of a latency as compared to the permitted QoS parameters mapped to the VNO. Therefore, high-level processing resource 111-2, for example, can be moved to a different data center that provides lower latency.

Conversely, VNMS 115 may determine that the latency for communication between a currently-used data center and the IoT devices it services is more than a threshold amount less than required by the VNO's QoS parameters. Therefore, high-level processing resource 111-2, for example, can be moved to a different data center that results in higher latency, but has other benefits (e.g., lower cost).

A second type of modification that can be implemented by VNMS 115 without administrator approval or input may be to move processing functionality among components. For instance, for a particular VNO, processing may be performed using high-level processing resource 111-1. VNMS 115 may determine that latency within core wireless network 110 is too high as compared to the permitted QoS parameters mapped to the VNO. Therefore, processing of high-level processing resource 111-1 performed on behalf of the particular VNO may be moved to gateway processing systems (i.e., closer to the edge of core wireless network 110), such as gateway processing system 114-1, as indicated by arrow 320.

The opposite may also be true. VNMS 115 may determine that latency within core wireless network 110 is more than a threshold below the permitted QoS parameters mapped to the VNO. Therefore, processing performed on behalf of the particular VNO may be moved from gateway processing systems, such as gateway processing system 114-1 to high-level processing resources 111 as indicated by arrow 320. Such an arrangement may add latency, but decrease cost by moving processing away from the edge of core wireless network 110.

A third type of modification that can be implemented by VNMS 115 without administrator approval or input may be to adjust an amount of bandwidth of one or more base stations designated for a particular VNO. Such modifications may be used for semi-static control of BW for each VNO. Such BW adjustments may be performed dynamically by the base station scheduler. For some VNOs, portions of bandwidth are explicitly received at one or more base stations 120. These portions of bandwidth may be explicitly designated BWPs. Bandwidth reallocation 330 to add additional bandwidth for a VWN of a VNO may be performed if the amount of data throughput (uplink, downlink, or both) for the particular VNO is not meeting the VNO's QoS parameters. Conversely, if the amount of bandwidth designed for the VNO's VWN is resulting in data throughput being at least a threshold above the VNO's QoS parameters, bandwidth for the VNO may be reduced such that it can be added for communication with IoT devices of another VNO.

A fourth type of modification that can be implemented by VNMS 115 without administrator approval or input may be to adjust the amount of processing resources allocated at a component of core wireless network 110. If traffic statistics indicate that processing is taking too long to be completed to meet a VNO's QoS parameters, available additional processing resources, such as processing resources 340 of high-level processing resource 111-1, may be allocated to the VNO's VWN. Alternatively, if traffic statistics indicate that processing time could be increased without violating the VNO's QoS parameters, processing resources may be unassigned from the VNO's VWN and devoted to other tasks (e.g., to some other VNO's VWN).

A fifth type of modification that can be implemented by VNMS 115 without administrator approval or input may be to adjust the topology of how core wireless network components communicate. For instance, if the total latency of delivery data from a VNO's IoT devices to the VNO's associated VNO system 140-1 is too high, rather than delivering the data through a high-level processing resource, gateway processing systems 114 may be instructed to communicate directly with VNO system 140-1. Such an arrangement may be understood as a change to the topology or hierarchy of the VNO's VWN.

Figure 4:
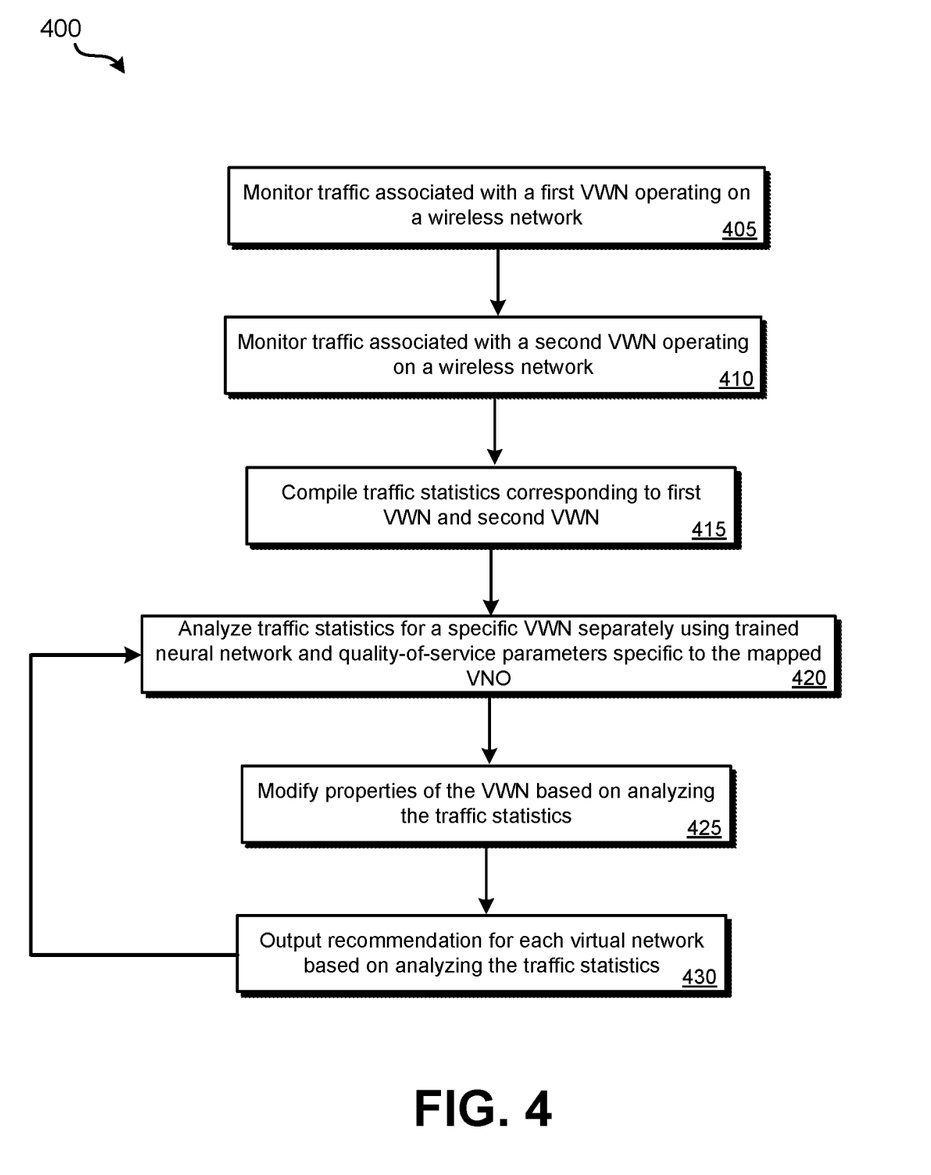
FIG. 4 illustrates an embodiment of a method for managing a multi-tenant wireless network.

Various methods may be performed using the systems detailed in relation to FIGS. 1-3. FIG. 4 illustrates an embodiment of a method 400 for managing a multi-tenant wireless network. Each block of method 400 may be performed using the systems of FIGS. 1-3. Specifically, each block of method 400 may be performed using the physical wireless network and its components, such as a traffic monitoring system and VNMS.

At block 405, traffic may be monitored on the physical wireless network, such as using various distributed traffic monitoring components. For instance, each data packet may be monitored through each component of the physical wireless network. The traffic monitored at block 405 may be mapped to a particular VWN (such as based on which IoT device it is associated with). This VWN is linked to a particular VNO. Therefore, a first entity that operates the physical wireless network has reached an agreement to operate a VWN on behalf of a second entity (VNO). The traffic monitored at block 405 may include tracking the volume of uplink and downlink data, the latency of uplink and downlink data, across some or all components of the wireless network. Tracking may also be performed in the amount of time to perform processing on data received from or to be transmitted to user equipment, such as wireless IoT devices. The traffic may be monitored in relation to time, therefore it may be possible to identify peaks and nadirs of VWN traffic for the VNO.

Similar to block 405, at block 410 traffic may be monitored on the physical wireless network. However, at this block, the traffic monitored may be linked to a different (a second) VWN. This VWN is linked to a different VNO. Therefore, the first entity that operates the physical wireless network has reached an agreement to operate another VWN on behalf of a third entity (VNO). The traffic monitored at block 410 may include tracking the volume of uplink and downlink data, the latency of uplink and downlink data, across some or all components of the wireless network. Tracking may also be performed in the amount of time to perform processing on data received from or to be transmitted to user equipment, such as wireless IoT devices. The traffic may be monitored in relation to time, therefore it may be possible to identify peaks and nadirs of VWN traffic for the VNO. The traffic data of block 410 is maintained separate from the traffic data of block 405. While method 400 includes the example of two VNO's having separate VWNs; it should be understood that this is an example only—other embodiments may include a greater number of VNOs each having their own VWN.

At block 415, traffic statistics may be compiled separately for the first VWN and the second VWN. These traffic statistics may include: latency data (uplink and/or downlink); data throughput (uplink and/or downlink); and processing times for some or all components of VWN. In some embodiments, the traffic statistics are divided up into two categories: short-term statistics and long-term statistics. In some embodiments, these statistics may be put into a human readable format for output in the form of a report. The traffic statistics compiled at block 415 may be fed to a VNMS for analysis.

At block 420, traffic statistics for a particular VNO's VWN may be analyzed. The analysis of block 420 may be performed using a trained neural network. Further, the analysis of block 420 may include comparing the traffic statistics for the specific VWN to VNO QoS parameters (e.g., latency, processing speed, data throughout) specific to the VNO for which the VWN is operated. This comparison may be used to determine situations in which QoS parameters are not met, are met but are exceeded by more than a threshold, or both. The analysis of block 420 may further include analyzing the current configuration data of the VWN.

At block 425, one or more properties of the VWN may be determined to be modified. The modifications determined by the neural network of block 420 may be based on how the neural network has been trained. A non-limiting list of properties that may be modified at block 425 are detailed in relation to FIG. 3.

At block 430, one or more recommendations may be output based on the analysis performed by the neural network at block 420. The recommendations output at block 430 may be presented to an administrator in the form of a report. In some embodiments, by an administrator approving the recommendation, the VNMS can cause the recommendation to be implemented. In other situations, the administrator may need to implement the recommendation manually (e.g., installing new hardware).

Following block 430 being performed, blocks 420 through 430 may be performed for the second VWN. This process may be continued until each VWN operated using the physical wireless network has been analyzed and, if needed, modified.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A multi-tenant network management system, comprising:
    a wireless network operated by a first entity;
    a first virtual wireless network operated as part of the wireless network on behalf of a second entity, wherein:
        the first virtual wireless network is mapped to a first set of operating level-of-service parameters;
    a second virtual wireless network operated as part of the wireless network on behalf of a third entity, wherein:
        the second virtual wireless network is mapped to a second set of level-of-service operating parameters that differ from the first set of level-of-service operating parameters;
    a traffic monitoring system that monitors and compiles separate short-term statistics and long-term statistics for each of the first virtual wireless network and the second virtual wireless network, wherein short-term statistics cover a time period of less than one week and the long-term statistics cover a time period of more than one week;
    a virtual network management system in communication with the traffic monitoring system, wherein:
        the virtual network management system uses a machine learning arrangement to determine how to modify properties of the first virtual wireless network to satisfy the first set of level-of-service operating parameters, wherein the machine learning arrangement uses the short-term statistics and the long-term statistics for each of the first virtual wireless network and the second virtual wireless network as separate inputs; and
        the virtual network management system modifies the first virtual wireless network based on the machine learning arrangement.

2. The multi-tenant network management system of claim 1, wherein the virtual network management system modifying the first virtual wireless network comprises altering an amount of wireless bandwidth assigned to the first virtual wireless network.

3. The multi-tenant network management system of claim 1, wherein the virtual network management system modifying the first virtual wireless network comprises altering a network topology of the first virtual wireless network to decrease latency.

4. The multi-tenant network management system of claim 1, wherein the virtual network management system modifying the first virtual wireless network comprises assigning additional processing resources to the first virtual wireless network.

5. The multi-tenant network management system of claim 1, wherein the virtual network management system modifying the first virtual wireless network comprises moving processing capabilities closer to an edge of the first virtual wireless network.

6. The multi-tenant network management system of claim 5, wherein moving processing capabilities closer to the edge of the first virtual wireless network comprises switching a data center hosting the processing capabilities.

7. The multi-tenant network management system of claim 1, wherein the machine learning arrangement is a neural network that provides an output.

8. The multi-tenant network management system of claim 1, wherein the virtual network management system is further configured to output a long-term recommendation.

9. The multi-tenant network management system of claim 1, wherein the virtual network management system is further configured to determine how to modify properties of the second virtual wireless network to satisfy the second set of level-of-service operating parameters.

10. The multi-tenant network management system of claim 1, wherein the first virtual wireless network and the second virtual wireless network are each exclusively used for communication with Internet of Things (IoT) devices.

11. A method for managing a multi-tenant wireless network, the method comprising:
monitoring, by a wireless network, traffic associated with a first virtual wireless network operating on the wireless network, wherein:
the wireless network is operated by a first entity;
the first virtual wireless network is operated on behalf of a second entity; and
the first virtual wireless network is mapped to a first set of operating level-of-service parameters;
monitoring, by the wireless network, traffic associated with a second virtual wireless network operating on the wireless network, wherein:
the second virtual wireless network is operated on behalf of a third entity; and
the second virtual wireless network is mapped to a second set of level-of-service operating parameters that differ from the first set of level-of-service operating parameters;
compiling, by a virtual network management system, separate short-term statistics and long-term statistics for each of the first virtual wireless network and the second virtual wireless network, wherein short-term statistics cover a time period of less than one week and long-term statistics cover a time period of more than one week;
determining, by the virtual network management system, using a machine learning arrangement, how to modify properties of the first virtual wireless network to satisfy the first set of level-of-service operating parameters, wherein the machine learning arrangement uses the short-term statistics and the long-term statistics for each of the first virtual wireless network and the second virtual wireless network as separate inputs; and
modifying, by the virtual network management system, the first virtual wireless network based on the analyzing.

12. The method for managing the multi-tenant wireless network of claim 11, wherein the virtual network management system modifying the first virtual wireless network comprises altering an amount of wireless bandwidth assigned to the first virtual wireless network.

13. The method for managing the multi-tenant wireless network of claim 11, wherein the virtual network management system modifying the first virtual wireless network comprises altering a network topology of the first virtual wireless network to decrease latency.

14. The method for managing the multi-tenant wireless network of claim 11, wherein the virtual network management system modifying the first virtual wireless network comprises assigning additional processing resources to the first virtual wireless network.

15. The method for managing the multi-tenant wireless network of claim 11, wherein the virtual network management system modifying the first virtual wireless network comprises moving processing capabilities closer to an edge of the first virtual wireless network.

16. The method for managing the multi-tenant wireless network of claim 15, wherein moving processing capabilities closer to the edge of the first virtual wireless network comprises switching a data center hosting the processing capabilities.

17. The method for managing the multi-tenant wireless network of claim 11, wherein the determining is performing using a neural network.

18. The method for managing the multi-tenant wireless network of claim 11, further comprising: determining, by the virtual network management system, how to modify properties of the second virtual wireless network to satisfy the second set of level-of-service operating parameters.

* * * * *